(12) United States Patent
Di et al.

(10) Patent No.: US 11,029,434 B2
(45) Date of Patent: Jun. 8, 2021

(54) METHOD FOR ACQUIRING DATA OF AZIMUTHAL ACOUSTIC LOGGING WHILE DRILLING

(71) Applicant: Institute of Geology and Geophysics, Chinese Academy of Sciences, Beijing (CN)

(72) Inventors: Qingyun Di, Beijing (CN); Wenxiu Zhang, Beijing (CN); Wenxuan Chen, Beijing (CN); Zili Wang, Beijing (CN); Yuntao Sun, Beijing (CN); Jian Zheng, Beijing (CN); Yongyou Yang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 1 day.

(21) Appl. No.: 16/123,715

(22) Filed: Sep. 6, 2018

(65) Prior Publication Data
US 2019/0129052 A1  May 2, 2019

(30) Foreign Application Priority Data
Nov. 2, 2017  (CN) .......................... 201711065205.8

(51) Int. Cl.
*E21B 49/00* (2006.01)
*G01V 1/46* (2006.01)
(Continued)

(52) U.S. Cl.
CPC .............. *G01V 1/46* (2013.01); *E21B 47/022* (2013.01); *E21B 49/00* (2013.01); *G01V 1/52* (2013.01); *E21B 47/18* (2013.01); *G01V 2200/16* (2013.01)

(58) Field of Classification Search
CPC .. G01V 1/46; G01V 1/52; E21B 49/00; E21B 47/18
See application file for complete search history.

(56) References Cited

U.S. PATENT DOCUMENTS

2004/0100263 A1\* 5/2004 Fanini ...................... G01V 3/28
324/339
2005/0234647 A1\* 10/2005 Haugland .............. G01V 11/00
702/6

(Continued)

*Primary Examiner* — John E Breene
*Assistant Examiner* — Eyob Hagos
(74) *Attorney, Agent, or Firm* — Novick, Kim & Lee, PLLC; Allen Xue

(57) ABSTRACT

In a method for acquiring data of azimuthal acoustic LWD, when an acoustic LWD instrument rotates with a drilling tool at a certain depth, data is acquired by adopting an azimuthal equal-interval mode: a well circumference is divided into m sectors by azimuthal intervals $\Delta\theta$, when a toolface angle of the acoustic LWD instrument is located in the $k^{th}$ sector, an acoustic transmitting source is controlled to transmit an acoustic signal, and an acoustic receiver measures the acoustic signal, digitizes it and then stores it as data in the $k^{th}$ sector; and the data is acquired for each sector in turn, and after the data is acquired in each sector for N times, the data acquisition at the current depth is completed. Meanwhile, as the drilling tool rotates and drills, the instrument acquires acoustic data at different depths and processes it to achieve azimuthal acoustic imaging.

9 Claims, 2 Drawing Sheets

(51) Int. Cl.
*G01V 1/52* (2006.01)
*E21B 47/022* (2012.01)
*E21B 47/18* (2012.01)

(56) References Cited

U.S. PATENT DOCUMENTS

| | | | | |
|---|---|---|---|---|
| 2005/0269082 | A1* | 12/2005 | Baron | E21B 47/022 |
| | | | | 166/255.2 |
| 2006/0260843 | A1* | 11/2006 | Cobern | E21B 47/024 |
| | | | | 175/45 |
| 2010/0040259 | A1* | 2/2010 | Morris | G01V 11/00 |
| | | | | 382/109 |
| 2011/0180327 | A1* | 7/2011 | Bittar | E21B 47/092 |
| | | | | 175/61 |
| 2012/0044783 | A1* | 2/2012 | Wang | G01V 1/46 |
| | | | | 367/35 |
| 2012/0089379 | A1* | 4/2012 | Conrad | G01V 1/40 |
| | | | | 703/2 |
| 2013/0064039 | A1* | 3/2013 | Pabon | G01V 1/52 |
| | | | | 367/25 |
| 2014/0241111 | A1* | 8/2014 | Mickael | G01V 1/48 |
| | | | | 367/7 |
| 2015/0330190 | A1* | 11/2015 | Wu | G01V 3/26 |
| | | | | 703/6 |
| 2016/0282512 | A1* | 9/2016 | Donderici | E21B 43/26 |
| 2017/0123097 | A1* | 5/2017 | Fang | G01N 27/041 |

\* cited by examiner

METHOD FOR ACQUIRING DATA OF AZIMUTHAL ACOUSTIC LOGGING WHILE DRILLING

TECHNICAL FIELD

The present invention relates to the technical field of logging while drilling (LWD), and particularly relates to a method for acquiring data of azimuthal acoustic LWD.

BACKGROUND

LWD acoustic measurement, LWD resistivity measurement, LWD radioactivity, and the like constitute a main body of a LWD technology. The acoustic LWD may measure a compressional wave velocity and a shear wave velocity of a formation while drilling is performed, thereby reducing the occupation time of a well rig and greatly lowering the acoustic logging cost. Its unique logging method may meet needs of highly-deviated wells, horizontal wells and deep-water drilling. The acoustic LWD obtains information closer to a virgin formation in time, which may be used to calculate mechanical properties of rock, predict pore pressure of the formation, evaluate the wellbore stability, and explain lithological changes, thereby providing an important means for accurately evaluating reservoirs and optimizing drilling trajectories.

The acoustic LWD technology has been undergoing the first generation of compressional wave logging technology and the second generation of compressional wave and shear wave logging technology since it has been put into production in 1990s, and has been developed to the third generation of azimuthal acoustic LWD technology with azimuthal detection characteristics. The technology usually adopts azimuthal acoustic source excitation, and utilizes drill collar rotation to obtain acoustic velocity information of the formation in different directions outside a well in real time, for describing three-dimensional mechanical properties of rock in a well circumference.

The acoustic LWD instrument generally consists of an acoustic transmitting source, an acoustic receiver and a sound insulator. When the instrument operates, the acoustic transmitting source periodically transmits acoustic energy pulses to the formation around a wellbore at an optimal frequency. Meanwhile, as the drilling tool rotates within the wellbore, an acoustic field generated by the acoustic energy pulses is received by the receiver in a process of downwards propagating along the wall of a well and the formation around the well, and the acoustic receiver samples received full-wave train signals to digitize waveforms, and assigns the data to different sectors according to the real-time measured toolface angle of the instrument. The sound insulator is located between the acoustic transmitting source and the sound wave receiver for attenuating direct wave signals propagating along a drill collar. After the data acquisition is completed, waveform data recorded by each sector is processed, and a time difference of each component wave (a compressional wave, a shear wave, a Stoneley wave, and the like) is calculated, and further the compressional wave velocity and the shear wave velocity of each azimuthal sector at the current depth are obtained, waveform data of an original acoustic wave is stored in a memory of a downhole instrument, and processing results are transmitted to the ground through a mud pulse telemetry technology in real time. As the drilling process continues, the above-mentioned acoustic signal measurement and data processing processes are repeated, and the compressional wave velocities and the shear wave velocities of multiple sectors at different depths are obtained, so that azimuthal acoustic LWD imaging is realized.

The azimuthal acoustic LWD instrument rotates with the downhole drilling tool as a part of the whole drill string. A rotational speed of the drilling tool usually ranges from 0 rpm to 300 rpm. An existing azimuthal acoustic LWD technology generally adopts a fixed time interval measurement mode, that is, a transmitter transmits acoustic excitation signals at fixed time intervals by programming, and the receiver records waveforms at the same time intervals, for example, measures them once per 100 ms. At the same time, the toolface angle of the instrument for each measurement is synchronously recorded (usually, a magnetic toolface angle or a gravity toolface angle is measured, the magnetic toolface angle is an angle turned by a projection line of an intersecting line of a true-north directional line as an initial line clockwise rotating to a toolface and a well-bottom round plane on a horizontal plane; and the gravity toolface angle is an angle turned by an intersecting line of a gravity high-side directional line as an initial line clockwise rotating to the toolface and the well-bottom round plane), and measured data is assigned to the azimuthal sectors according to the current value of the toolface angle, and a signal to noise ratio is increased by superposing the data within each sector. Such a fixed time interval measurement mode acquires the data, and the coverage of data in the azimuthal sectors depends on the rotational speed and the penetration speed of the drilling tool. There are the following problems.

1. When the rotational speed of the drilling tool is lower and the penetration speed is lower, there are many measurement records covered by each sector, and there is data redundancy. Large data quantity imposes a burden on real-time processing and storage of downhole data, and due to frequent measurements, power consumption of the instrument is increased.

2. When the rotational speed of the drilling tool is higher and the penetration speed is higher, the number of measurement records assigned to different sectors is random, there are many measurement records in some sectors, and few measurement records or no measurement records in some sectors. Furthermore, the data quantity in different sectors is imbalanced, and the quality of the data after being subjected to superposition is inconsistent, which affects a data processing imaging result.

SUMMARY

In view of the above problems, the present invention provides a method for acquiring data of azimuthal acoustic logging while drilling (LWD), which acquires data by using an azimuthal equal-interval measurement mode, and achieves equilibrium coverage of data in different sectors as a drilling tool rotates, thereby improving the data processing imaging effect, and overcoming problems in a fixed time interval measurement mode adopted by an existing azimuthal acoustic LWD technology that coverage of data in azimuthal sectors is affected by a rotational speed and a penetration speed of the drilling tool and the coverage of the data in different sectors is imbalanced.

The present invention is achieved by the following technical solution.

There is provided a method for acquiring data of azimuthal acoustic LWD. When an acoustic LWD instrument rotates with the drilling tool at a certain depth, the acoustic LWD instrument acquires data by adopting an azimuthal equal-interval acquisition mode;

the azimuthal equal-interval acquisition mode is as follows: a well circumference is divided into m sectors by an azimuthal interval $\Delta\theta$, when a toolface angle of the acoustic LWD instrument is located in the $k^{th}$ sector, an acoustic transmitting source is controlled to transmit an acoustic signal, and an acoustic receiver measures the acoustic signal, digitizes it and then stores it as data in the $k^{th}$ sector; and the data is acquired for each sector in turn, and after the data is acquired in each sector for N times, the data acquisition at the current depth is completed; and wherein $\Delta\theta=360/m$, m is a positive integer greater than 1, k represents a serial number of the sector, $k\in[1, m]$, and k is a positive integer greater than or equal to 1.

Further, that a toolface angle of the acoustic LWD instrument is located in the $k^{th}$ sector means that $\theta$ conforms to a condition $(k-1)\Delta\theta<\theta<k\Delta\theta$; and the $\theta$ is the toolface angle of the acoustic LWD instrument.

Further, after completing data acquisition at a certain depth, the acoustic LWD instrument enters the next depth point and continues to acquire the data by adopting the azimuthal equal-interval acquisition mode together with the drilling tool to realize acquisition of data at different depths.

Further, the acoustic receiver includes n sets of receiving transducer arrays, and the data acquired for N times in each sector is superimposed to obtain a measured data volume $A(k, p)$, $p=1, 2, \ldots n$; and p represents a serial number of then sets of receiving transducer arrays.

Further, after the data acquisition at a certain depth is completed, waveform data recorded by each sector is processed by a slowness-time correlation (STC) method to obtain compressional wave velocities and shear wave velocities of different sectors at a current depth measurement point.

Further, the toolface angle is a gravity toolface angle measured by gravity accelerometers or a magnetic toolface angle measured by magnetometers.

Further, the number of the sectors is m=8 or 16.

Further, the acoustic transmitting source adopts unipole transmission or dipole transmission;

when the unipole transmission is adopted, a transmission frequency is selected to be 10 kHz to 15 kHz; and when the dipole transmission is adopted, the transmission frequency is selected to be 2 kHz to 5 kHz.

The present invention has the following advantageous technical effects:

the present invention adopts an azimuthal equal-interval acquisition mode, the number of times of superposition of data in each sector may be controlled, and the coverage of the data is not limited by a rotational speed; and the present invention adopts the azimuthal equal-interval acquisition mode, and measurement times of coverage of each sector are the same, the quantity of the data is balanced, and the imaging quality of the data is improved.

DETAILED DESCRIPTION

In order to make objectives, technical solutions and advantages of the present invention be clearer, the present invention will be further described in detail below in conjunction with accompanying drawings and embodiments. It should be understood that the specific embodiments described herein are merely illustrative of the present invention and are not intended to limit the present invention.

Rather, the present invention encompasses any alternatives, modifications, and equivalent methods and solutions of the present invention as defined by appended claims and made within the spirit and scope of the present invention. Further, in order to provide the public with a better understanding of the present invention, some specific details are described in detail in the following detailed description of the present invention. The present invention may be fully understood by those skilled in the art without a description of these details.

Embodiment 1

Figure 1:
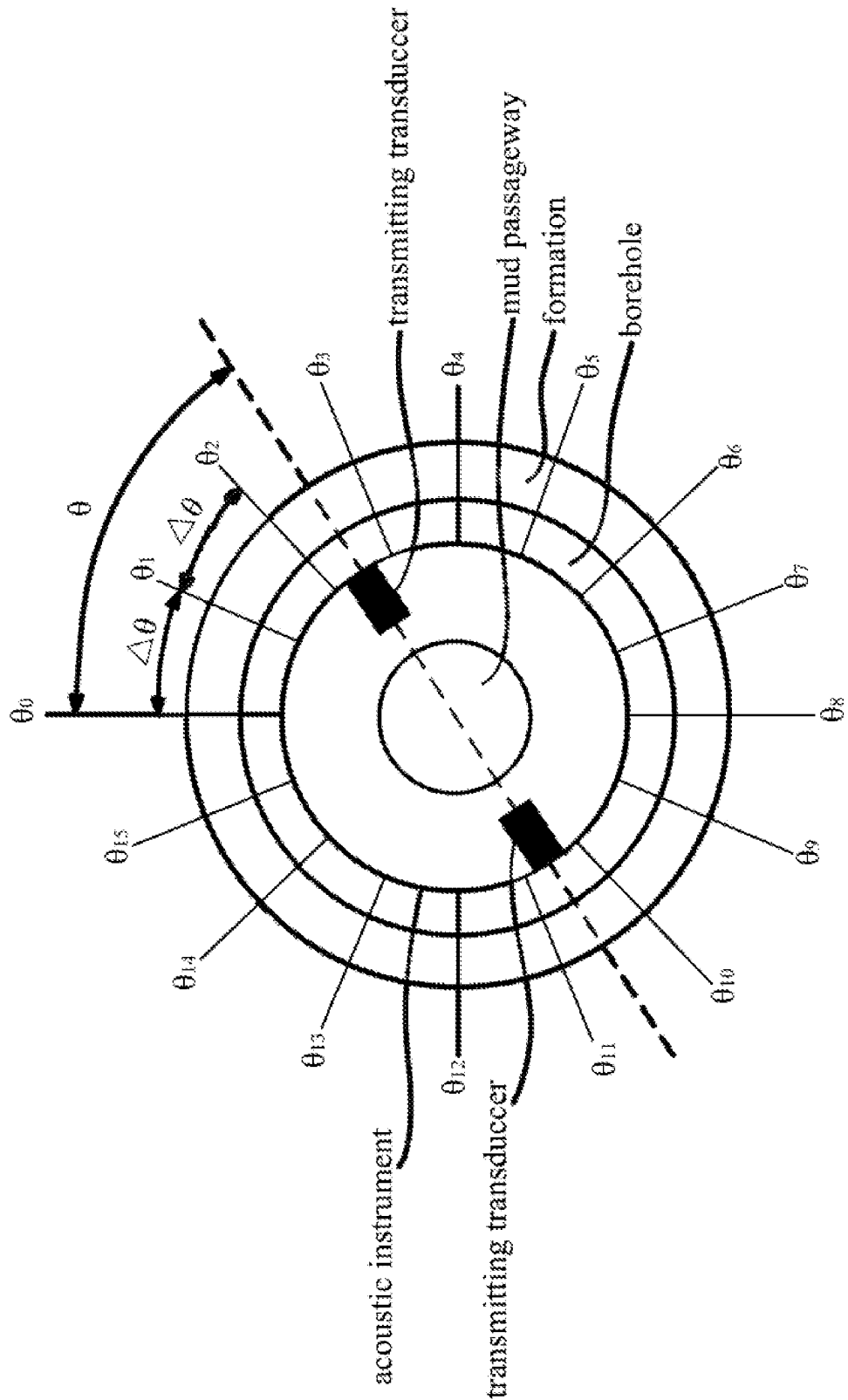
FIG. 1 is a schematic diagram of an azimuthal equal-interval acquisition mode of azimuthal acoustic LWD.

FIG. 1 is a schematic diagram of an azimuthal equal-interval acquisition mode of azimuthal acoustic LWD. FIG. 1 shows a cross section of positions of transmitting transducers. An instrument is in the middle of a wellbore. In a drilling process, the transmitting transducers rotate around the axis of the instrument. FIG. 1 shows a dipole transmitting source, including two transmitting transducers, or shows a unipole transmitting source, which only uses one transmit transducer. A round hole in the middle of the instrument provides a mud passageway, an angle $\theta$ is an included angle between the axis of the transmitting transducers and a position of a toolface angle reference value $\theta_0$ of the instrument.

It is assumed that an azimuthal interval is $\Delta\theta$, $\Delta\theta=360/m$, and m is the number of measured sectors. By way of an example that the number of imaging sectors is 16, then $\Delta\theta=22.5$ degrees. The toolface angle reference value $\theta_0$ of the instrument is equal to 0 degree, that is, for a gravity toolface angle, the axis of the transmitting transducers points to a high-side. When a magnetic toolface angle is used, the axis of the transmitting transducers points to a geomagnetic north direction.

$\theta_k$ represents an angular boundary of adjacent sectors, $\theta_k=k\Delta\theta$, $k=1 \ldots m$, and the $k^{th}$ sector is located between $\theta_{k-1}$ and $\theta_k$.

When an azimuthal acoustic LWD apparatus acquires data at each depth point, firstly, according to an azimuthal equal-interval acquisition mode, starting from the first sector, data acquisitions of m sectors for the first time are sequentially completed, and then according to a requirement for the number of times of superposition, data acquisitions of m sectors for multiple times are completed. Coverage times of the data in each sector are the same, and are equal to the number of times of superposition. Next, a work flow of the azimuthal equal-interval acquisition mode of azimuthal acoustic LWD will be introduced specifically by steps. A method for acquiring data of azimuthal acoustic LWD acquires data by adopting the azimuthal equal-interval acquisition mode. The work flow of the azimuthal equal-interval acquisition mode of azimuthal acoustic LWD is as follows:

(1) initializing a serial number of a to-be-measured sector, and measuring a first sector:

when measurement is performed at each depth point, m sectors are, and firstly starting from the first sector, the serial number of the sector is set to k=1;

(2) measuring a current toolface angle $\theta$ of the instrument, and determining whether the toolface angle $\theta$ of the instrument is within the to-be-measured sector or not:

the gravity toolface angle or magnetic toolface angle is measured by utilizing accelerometers or magnetometers, when the toolface angle has not yet fallen into the to-be-measured sector, and re-measured until the toolface angle is in the to-be-measured sector, wherein the gravity toolface angle is measured by adopting two orthogonal accelerometers, which are installed radially along the drilling tool, and a sensitive axis of one of the accelerometers is oriented along the axis of the transmitting transducers. The magnetic toolface angle is measured by adopting two orthogonal magnetometers, installation directions of which are the same as those of the accelerometers, and installation positions of which need to avoid a magnetic interference area;

(3) controlling an acoustic transmitting source to transmit directional radiation acoustic signals to a formation:

the acoustic transmitting source is controlled to transmit acoustic energy pulses to the formation around a wellbore at an optimal frequency, when unipole transmission is adopted, a transmission frequency is selected to be 10 kHz to 15 kHz, and when dipole transmission is adopted, the optimum frequency is selected to be 2 kHz to 5 kHz;

(4) controlling an acoustic receiver to synchronously acquire the data:

the acoustic receiver includes n sets of receiving transducer arrays, and the receiving arrays synchronously acquire the data, and waveform data acquired for multiple times in each sector is superimposed to obtain a measured data volume $A(k, p)$, $p=1, 2, \ldots n$, k represents a serial number of the sector, and p represents a serial number of the sets of receiving transducer arrays, an acoustic wave field generated by the acoustic energy pulses is received by the receiving arrays in a process of downward propagating along the wall of a well and the formation around the well, and the receiving arrays sample received full-wave train signals to digitize waveforms. In order to save a storage space, for each sector, the data measured by the receiving transducers for multiple times is superimposed, (5) ending a current measurement and generating a sector step $k=k+1$:

signal measurement and data superposition of the sector are completed, the serial number of the sector is incremented, and the next sector measurement is prepared;

(6) determining whether all azimuthal measurements are completed or not $k>m$:

when the serial number of the next sector is less than or equal to the number m of sectors, it indicates that all the sector measurements have not been completed yet, and the flow proceeds to the step (2); and when the serial number of the next sector is greater than the number m of sectors, it indicates that all the sector measurements have been completed, the flow proceeds to a step (7);

(7) determining whether superimposing N measurements are completed or not:

in order to improve the quality of the data, usually, data in each sector needs to be acquired for multiple times and the acquired data is superimposed, and when the required N times of superposition are completed, the data acquisition at this depth point is completed, when the required number of times of superposition are not completed, the process proceeds to the step (1), and the next round of data acquisition of all the sectors is performed, further, a step (8) may be performed for the data acquired; and (8) processing the data volume $A(k, p)$ by utilizing a slowness-time correlation (STC) method to obtain compressional wave velocities $V_c(k)$ and shear wave velocities $V_s(k)$ of different sectors at the current measurement point, after the acquisition is completed, waveform data recorded by each sector is processed usually by adopting the slowness-time correlation (STC) method, a time difference of each component wave is calculated by providing a time window in a set of full-wave trains, finding compressional waves, shear waves and Stoneley waves by moving the time window at a certain slowness (time difference), and calculating a series of relevant coefficients, further the compressional wave velocity and the shear wave velocity of each azimuthal sector at a given depth are obtained, waveform data of an original acoustic wave is stored in a memory of a downhole instrument, and processing results are transmitted to the ground through a mud pulse telemetry technology in real time, and so far, an azimuthal equal-interval acquisition process of the current depth point is completed.

Figure 2:
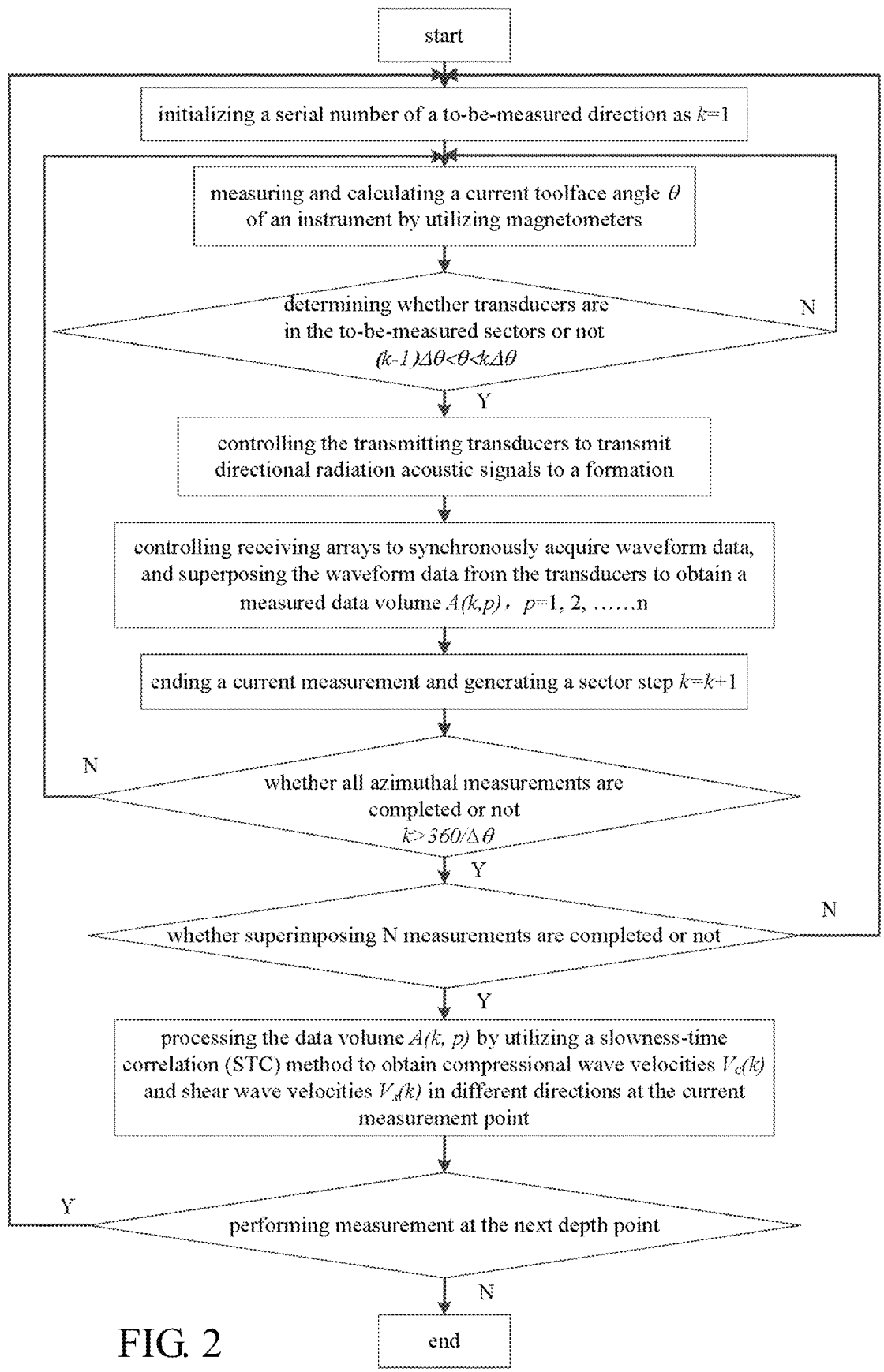
FIG. 2 is a work flow diagram of an azimuthal equal-interval acquisition mode of azimuthal acoustic LWD.

Further, the method for acquiring data may further include a step (9):

(9) performing acquisition at the next depth point:

as the drilling process continues, the above-mentioned acoustic signal measurement and data processing processes are repeated, thereby obtaining compressional wave and shear wave velocities of multiple sectors at different depths, and realizing azimuthal LWD imaging. A schematic diagram of the work flow of the steps (1) to (9) is shown in FIG. 2.

What is claimed is:

1. A method for acquiring data of azimuthal acoustic Logging While Drilling (LWD), comprising:
   rotating a drilling tool in a well in a subterranean formation, wherein the drilling tool comprises an acoustic instrument having an acoustic transmitter and an acoustic receiver installed thereon;
   performing an azimuthal equal-interval acquisition mode for acoustic logging using the acoustic instrument at a first depth in the well, wherein the step of performing an azimuthal equal-interval acquisition mode for acoustic logging comprises the sub-steps of:
   a. dividing a circumference of the well into m sectors, each sector has an azimuthal angle of 360°/m, wherein m is an integer larger than one;
   b. measuring a toolface angle $\theta$ of the acoustic instrument;
   c. determining the acoustic instrument is in a $k^{th}$ sector when the toolface angle $\theta$ is larger than $(k-1) \cdot 360°/m$ and smaller than $k \cdot 360°/m$, wherein k is in a range from 1 to m;
   d. transmitting an acoustic signal from the acoustic transmitter into the subterranean formation when the acoustic instrument is in the $k^{th}$ sector;
   e. receiving the acoustic signal by the acoustic receiver from the subterranean formation;
   f. digitizing and storing the received acoustic signal as data in the $k^{th}$ sector, wherein data is waveform data;
   g. repeating sub-steps d, e, and f so that the $k^{th}$ sector receives N sets of data, wherein N is a positive integer;
   h. superimposing the N sets of data to obtain an superimposed data volume for the $k^{th}$ sector; and
   i. performing sub-steps c-h for a $(k^{th}+1)$ sector until $(k^{th}+1)$ equals m.

2. The method for acquiring data of azimuthal acoustic LWD according to claim 1, comprising performing acoustic logging using the acoustic instrument at a second depth in the well.

3. The method for acquiring data of azimuthal acoustic LWD according to claim 1, wherein the acoustic receiver comprises n sets of receiving transducer arrays, and the superimposed data volume for the $k^{th}$ sector is A(k, p), p=1, 2, . . . n, wherein p represents a serial number of the n sets of receiving transducer arrays and n is a positive integer.

4. The method for acquiring data of azimuthal acoustic LWD according to claim 3, further comprising processing the superimposed data volume in each sector by a slowness-time correlation (STC) method to obtain a compressional wave velocity and a shear wave velocity for each of the sectors at the first depth.

5. The method for acquiring data of azimuthal acoustic LWD according to claim 1, wherein the toolface angle is a gravity toolface angle measured by gravity accelerometers or a magnetic toolface angle measured by a magnetometer.

6. The method for acquiring data of azimuthal acoustic LWD according to claim 1, wherein m=8 or 16.

7. The method for acquiring data of azimuthal acoustic LWD according to claim 1, wherein the acoustic transmitter uses unipole transmission or dipole transmission.

8. The method for acquiring data of azimuthal acoustic LWD according to claim 7, wherein a transmission frequency of the unipole transmission is 10 kHz to 15 kHz.

9. The method for acquiring data of azimuthal acoustic LWD according to claim 7, wherein a transmission frequency of the dipole transmission is 2 kHz to 5 kHz.

* * * * *